US012712204B2

(12) United States Patent
Zhang et al.

(10) Patent No.: US 12,712,204 B2
(45) Date of Patent: Aug. 18, 2026

(54) ELECTROLYTE, ELECTROCHEMICAL DEVICE INCLUDING SAME, AND ELECTRONIC DEVICE

(71) Applicant: Ningde Amperex Technology Limited, Ningde (CN)

(72) Inventors: ShuiRong Zhang, Ningde (CN); Xiao Yuan, Ningde (CN); Lilan Zhang, Ningde (CN); Chao Tang, Ningde (CN)

(73) Assignee: Ningde Amperex Technology Limited, Ningde City (CN)

(*) Notice: Subject to any disclaimer, the term of this patent is extended or adjusted under 35 U.S.C. 154(b) by 864 days.

(21) Appl. No.: 17/708,622

(22) Filed: Mar. 30, 2022

(65) Prior Publication Data

US 2022/0223915 A1 Jul. 14, 2022

Related U.S. Application Data

(63) Continuation of application No. PCT/CN2020/124033, filed on Oct. 27, 2020.

(51) Int. Cl.
*H01M 10/0567* (2010.01)
*H01M 10/0525* (2010.01)
(Continued)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0034* (2013.01)

(58) Field of Classification Search
CPC .................................................. H01M 10/0567
See application file for complete search history.

(56) References Cited

U.S. PATENT DOCUMENTS

| | | | | |
|---|---|---|---|---|
| 2014/0072865 A1* | 3/2014 | Suh | H01M 10/0567 429/188 |
| 2015/0099193 A1* | 4/2015 | Hamasaki | H01M 10/0568 429/200 |

(Continued)

FOREIGN PATENT DOCUMENTS

| | | |
|---|---|---|
| CN | 104852087 A | 8/2015 |
| CN | 108232300 A | 6/2018 |

(Continued)

OTHER PUBLICATIONS

International Search Report mailed Aug. 2, 2021, corresponding to International Application No. PCT/CN2020/124033; 4 pages.

(Continued)

*Primary Examiner* — Allison Bourke
*Assistant Examiner* — Kayla Elaine Clary
(74) *Attorney, Agent, or Firm* — Maier & Maier, PLLC

(57) ABSTRACT

An electrolyte including a dinitrile compound, a multi-nitrile compound with more than 2 cyano groups, and a boron-containing lithium salt. Based on a total weight of the electrolyte, a content of the dinitrile compound is A %, a content of the multi-nitrile compound is B %, and a content of the boron-containing lithium salt is C %, and $0 \leq (A/B) - C + 1 \leq 11$. The cycle performance of the electrochemical device including the electrolyte is improved at a high temperature and in a high state of charge.

17 Claims, 1 Drawing Sheet

(51) Int. Cl.
*H01M 10/0568* (2010.01)
*H01M 10/0569* (2010.01)

(56) References Cited

U.S. PATENT DOCUMENTS

| | | | | |
|---|---|---|---|---|
| 2016/0301103 | A1* | 10/2016 | Kim | H01M 10/0567 |
| 2020/0099098 | A1* | 3/2020 | Wang | H01M 10/0569 |
| 2020/0303767 | A1* | 9/2020 | Wang | H01M 4/362 |
| 2022/0002160 | A1* | 1/2022 | Liang | H01M 4/587 |

FOREIGN PATENT DOCUMENTS

| | | | | | |
|---|---|---|---|---|---|
| CN | 108666623 | A | | 10/2018 | |
| CN | 109301326 | A | | 2/2019 | |
| CN | 109792085 | A | | 5/2019 | |
| CN | 109860703 | A | | 6/2019 | |
| CN | 111146410 | A | | 5/2020 | |
| CN | 111525191 | A | | 8/2020 | |
| CN | 111769328 | A | | 10/2020 | |
| CN | 109301326 | B | * | 11/2020 | H01M 4/70 |
| JP | 2020-114784 | A | | 7/2020 | |

OTHER PUBLICATIONS

Office Action issued on Aug. 31, 2024, in corresponding Chinese Application No. 202080106738.X, 15 pages.
Extended Search Report issued on Jan. 5, 2023, in corresponding European Application No. 20953504.6, 6 pages.
Office Action issued on Jun. 19, 2023, in corresponding Indonesian Application No. P00202203858, 6 pages.

* cited by examiner

ELECTROLYTE, ELECTROCHEMICAL DEVICE INCLUDING SAME, AND ELECTRONIC DEVICE

CROSS REFERENCE TO RELATED APPLICATIONS

The present application is a bypass continuation application of PCT international application: PCT/CN2020/124033, filed on 27 Oct. 2020, the disclosure of which is hereby incorporated by reference in its entirety.

TECHNICAL FIELD

This application relates to the technical field of energy storage, and in particular, to an electrolyte, an electrochemical device including same, and an electronic device, especially a lithium-ion battery.

BACKGROUND

Electrochemical devices (such as a lithium-ion battery) are widely used in the fields such as computers, smart wearable devices, smartphones, unmanned aerial vehicles, and electric vehicles by virtue of advantages such as a high energy density, a high working voltage, a low self-discharge rate, a long cycle life, and no pollution. With the progress of modern information technology and the expansion of the application scope of the lithium-ion battery, higher requirements are posed on the performance of the lithium-ion battery, for example, the cycle performance of the lithium-ion battery at a high temperature and in a high state of charge.

Currently, how to achieve good cycle performance of the lithium-ion battery at a high temperature and in a high state of charge is an important topic of research in the field of batteries.

SUMMARY

This application provides an electrolyte and an electrochemical device containing same in an attempt to solve at least one problem in the related art to at least some extent.

This application provides an electrolyte. The electrolyte includes at least a dinitrile compound, a multi-nitrile compound with more than 2 cyano groups, and a boron-containing lithium salt. By controlling the weight percent of the three ingredients, this application provides excellent cycle performance of the electrochemical device at a high temperature and in a high state of charge.

According to one aspect, this application provides an electrolyte. The electrolyte includes a dinitrile compound, a multi-nitrile compound with more than 2 cyano groups, and a boron-containing lithium salt. Based on a total weight of the electrolyte, a content of the dinitrile compound is A %, a content of the multi-nitrile compound is B %, and a content of the boron-containing lithium salt is C %, and $A/B \geq 1.2$ and $0 \leq (A/B) - C + 1 \leq 11$.

According to some embodiments of this application, the dinitrile compound includes a compound represented by Formula I:

Formula I

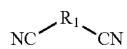

where, $R_1$ is selected from a substituted or unsubstituted $C_1$ to $C_9$ alkylidene, a substituted or unsubstituted $C_2$ to $C_{10}$ alkenylene, $-R_a-O-R_b-$, or $-R_c-O-R_d-O-R_e-$, where $R_a$, $R_b$, $R_c$, and $R_e$ are each independently selected from a single bond or a substituted or unsubstituted $C_1$ to $C_5$ alkylidene, $R_a$ and $R_b$ are not both single bonds at the same time, and $R_d$ is selected from a substituted or unsubstituted $C_1$ to $C_5$ alkylidene, in which a substituent for substitution is halogen.

According to some embodiments of this application, the multi-nitrile compound includes a compound represented by Formula II:

Formula II

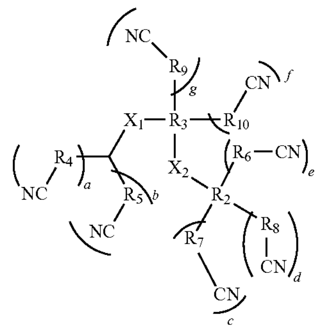

where, $R_2$ is selected from H, C, CH, $CH_2$, or $CH_3$; $R_3$ is selected from C, CH, or $CH_2$; $R_4$, $R_5$, $R_6$, $R_7$ $R_8$, $R_9$, and $R_{10}$ are each independently selected from a single bond, a substituted or unsubstituted $C_1$ to $C_5$ alkylidene, or $-R_f-O-R_g-$, where $R_f$ and $R_g$ each are independently selected from a single bond or a substituted or unsubstituted $C_1$ to $C_5$ alkylidene, in which a substituent for substitution is halogen; $X_1$ and $X_2$ each are independently selected from a single bond, oxygen, or a substituted or unsubstituted $C_1$ to $C_5$ alkylidene, in which a substituent for substitution is halogen; and a, b, c, d, e, f, and g each are independently 0 or 1, and at least three of a, b, c, d, e and f are not zero.

According to some embodiments of this application, the dinitrile compound includes at least one of:

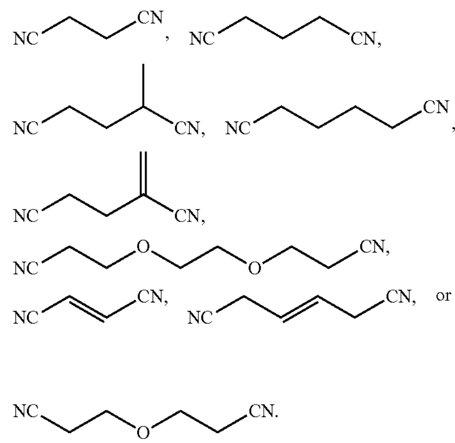

, , , , , , or .

According to some embodiments of this application, the multi-nitrile compound includes at least one of:

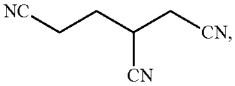
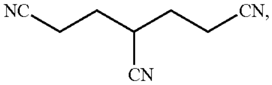
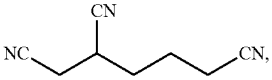
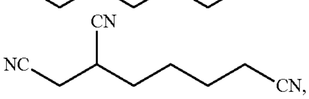
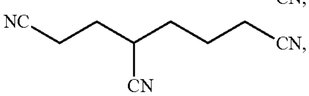
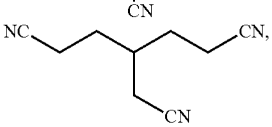
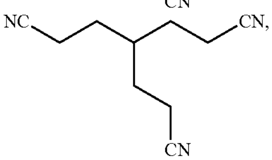
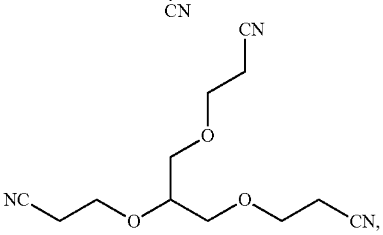
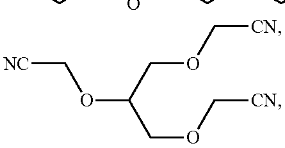
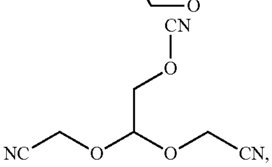
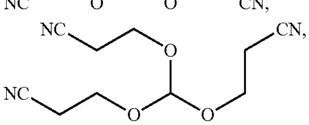
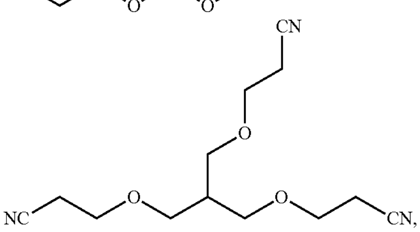
or
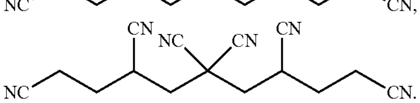

According to some embodiments of this application, 3≤A+B≤20.

According to some embodiments of this application, the boron-containing lithium salt includes at least one of lithium bis(oxalato)borate, lithium difluoro(oxalato)borate, lithium tetrafluoroborate, or lithium tetraborate, where C≤A.

According to some embodiments of this application, the electrolyte further includes a boron-free lithium salt. Based on the total weight of the electrolyte, a weight percent of the boron-free lithium salt is D %, and 0.01≤C/D×12.5≤3.8.

According to some embodiments of this application, the electrolyte further includes fluoroethylene carbonate. Based on the total weight of the electrolyte, a content of the fluoroethylene carbonate is E %, and 5≤A+E≤25.

According to another aspect, this application further provides an electrochemical device. The electrochemical device includes a positive electrode, a negative electrode, a separator, and any of the electrolytes described above.

According to some embodiments of this application, the negative electrode includes negative active material particles. The negative active material particles satisfy at least one of condition (a) or (b): (a) $D_{n10}$ of the negative active material particles is 1 μm to 9 μm; and (b) $D_{v50}$ of the negative active material particles is 5 μm to 18 μm.

According to some embodiments of this application, when the negative active material particles satisfy at least condition (a), the negative active material particles further satisfy at least one of condition (c) or (d): (c) when $D_{n10}$ of the negative active material particles is less than 5 μm, $5D_{n10}<D_{v50}<12D_{n10}$; and (d) when $D_{n10}$ of the negative active material particles is greater than or equal to 5 μm, $1.5D_{n10}<D_{v50}<4D_{n10}$.

According to another aspect, this application further provides an electronic device. The electronic device includes any of the electrochemical devices described above.

Additional aspects and advantages of the embodiments of this application will be described or illustrated in part later herein or expounded through implementation of the embodiments of this application.

BRIEF DESCRIPTION OF DRAWINGS

For ease of describing the embodiments of this application, the following outlines the drawings needed for describing the embodiments of this application or the prior art. Evidently, the drawings outlined below are merely a part of embodiments in this application. Without making any creative efforts, a person skilled in the art can still obtain the drawings of other embodiments according to the structures illustrated in these drawings.

DETAILED DESCRIPTION

Figure 1A:
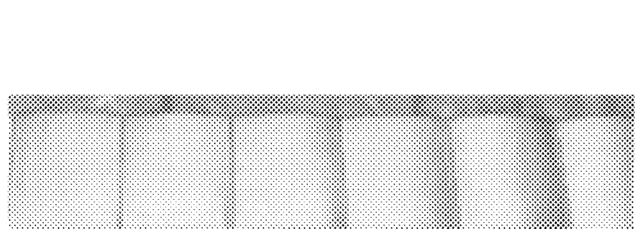
FIG. 1A to FIG. 1C are schematic diagrams showing no occurrence of lithium plating, occurrence of lithium plating, and occurrence of severe lithium plating on a negative electrode of a lithium-ion battery respectively.

Embodiments of this application will be described in detail below. The embodiments described herein with reference to the drawings are illustrative and graphical in nature, and are intended to enable a basic understanding of this application. The embodiments of this application are not to be construed as a limitation on this application.

The term "approximately" used herein is intended to describe and represent small variations. When used with reference to an event or situation, the terms may denote an example in which the event or situation occurs exactly and an example in which the event or situation occurs very approximately. For example, when used together with a numerical value, the term may represent a variation range falling within ±10% of the numerical value, such as ±5%, ±4%, ±3%, ±2%, ±1%, ±0.5%, ±0.1%, or ±0.05% of the numerical value. For example, if a difference between two numerical values falls within ±10% of an average of the numerical values (such as ±5%, ±4%, ±3%, ±2%, ±1%, ±0.5%, ±0.1%, or ±0.05% of the average), the two numerical values may be considered to be "approximately" the same.

In addition, a quantity, a ratio, or another numerical value is sometimes expressed in a range format herein. Understandably, such a range format is for convenience and brevity, and shall be flexibly understood to include not only the numerical values explicitly specified and defined in the range, but also all individual numerical values or sub-ranges covered in the range as if each individual numerical value and each sub-range were explicitly specified.

In the embodiments and claims, a list of items referred to by using the terms such as "at least one of", "at least one thereof", "at least one type of" or other similar terms may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single component or a plurality of components. The item B may include a single component or a plurality of components. The item C may include a single component or a plurality of components.

As referred to herein, the term "alkylidene" means a linear or branched divalent saturated hydrocarbyl. For example, an alkylidene may be an alkylidene with 1 to 20 carbon atoms, an alkylidene with 1 to 15 carbon atoms, an alkylidene with 1 to 10 carbon atoms, an alkylidene with 1 to 5 carbon atoms, an alkylidene with 5 to 20 carbon atoms, an alkylidene with 5 to 15 carbon atoms, or an alkylidene with 5 to 10 carbon atoms. Representative alkylidenes include (for example) methylene, ethane-1,2-diyl ("ethylene"), propane-1,2-diyl, propane-1,3-diyl, butane-1,4-diyl, pentane-1,5-diyl, and the like. In addition, the alkylidene may be optionally substituted.

The term "alkenylene" covers linear and branched alkenylenes. An alkenylene of which a quantity of carbon atoms is specified means to cover all geometric isomers that each contain such quantity of carbon atoms. For example, an alkenylene may be an alkenylene with 2 to 20 carbon atoms, an alkenylene with 2 to 15 carbon atoms, an alkenylene with 2 to 10 carbon atoms, an alkenylene with 2 to 5 carbon atoms, an alkenylene with 5 to 20 carbon atoms, an alkenylene with 5 to 15 carbon atoms, or an alkenylene with 5 to 10 carbon atoms. Representative alkenylenes include (for example) vinylidene, propenylidene, butenylidene, and the like. In addition, the alkenylene may be optionally substituted.

As referred to herein, the term "halogen" may be F, Cl, Br, or I.

When substituting, the foregoing substituent may be at least one selected from halogen, alkyl, cycloalkyl, alkenyl, aryl, or heteroaryl.

Some embodiments of this application relate to an electrochemical device. The electrochemical device includes a positive electrode, a negative electrode, a separator, and an electrolyte. In some embodiments, the electrochemical device is a lithium-ion battery.

When the lithium-ion battery is charged and discharged at a high temperature and in a high state of charge, the positive electrode is in an unstable state, and is likely to deoxidize.

The intercalated oxygen is prone to side reactions with the electrolyte and is prone to oxidize the electrolyte, thereby leading to relatively low cycle performance of the lithium-ion battery.

In this application, it is found that a nitrile compound can coordinate with a transition metal element to stabilize the positive electrode, but the structure of the nitrile compound affects the effect of improving the stability. Adding a multi-nitrile compound with more than 2 cyano groups into the electrolyte can improve complexation efficiency of the transition metal ions of the positive electrode. However, a large steric hindrance of the multi-nitrile compound gives rise to gaps between the multi-nitrile compounds, so that the positive electrode cannot be protected sufficiently. With a low steric hindrance, the dinitrile compound can compensate for the effect of protection for a positive electrode interface that the multi-nitrile compound fails to protect. It is also found that the boron (B) in the boron-containing lithium salt interacts with the oxygen atom (O) on the surface of the positive electrode to form a B—O bond. The bond can stabilize the positive electrode and further compensate for the effect of protection for the positive electrode part that fails to be protected due to steric effects. With the protection for this part, the electrochemical device achieves good cycle performance at a high temperature and in a high state of charge.

I. Electrolyte

The electrolyte according to this application includes a dinitrile compound, a multi-nitrile compound with more than 2 cyano groups, and a boron-containing lithium salt. Based on a total weight of the electrolyte, a content of the dinitrile compound is A %, a content of the multi-nitrile compound is B %, and a content of the boron-containing lithium salt is C %, and A, B, and C satisfy $0 \leq (A/B)-C+1 \leq 11$.

In some embodiments, the dinitrile compound includes a compound represented by Formula I:

Formula I

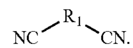

In Formula I, $R_1$ is selected from a substituted or unsubstituted $C_1$ to $C_9$ alkylidene, a substituted or unsubstituted $C_2$ to $C_{10}$ alkenylene, —$R_a$—O—$R_b$—, or —$R_c$—O—$R_d$—O—$R_e$—, where $R_a$, $R_b$, $R_c$, and $R_e$ each are independently selected from a single bond or a substituted or unsubstituted $C_1$ to $C_5$ alkylidene, $R_a$ and $R_b$ are not both single bonds, and $R_d$ is selected from a substituted or unsubstituted $C_1$ to $C_5$ alkylidene, in which a substituent for substitution is halogen.

In some embodiments, the dinitrile compound includes at least one of:

compound I-1

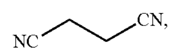

compound I-2

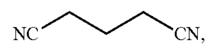

compound I-3

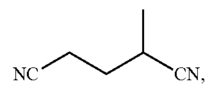

-continued compound I-4 compound I-5 compound I-6 compound I-7 compound I-8 or compound I-9

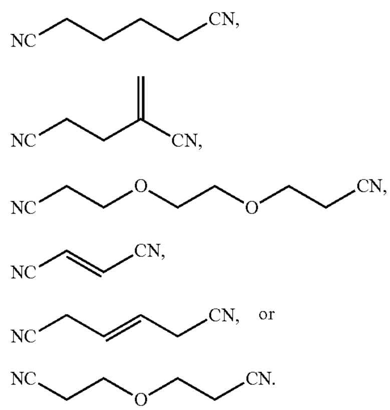

In some embodiments, the multi-nitrile compound with more than 2 cyano groups includes a compound represented by Formula II:

Formula II

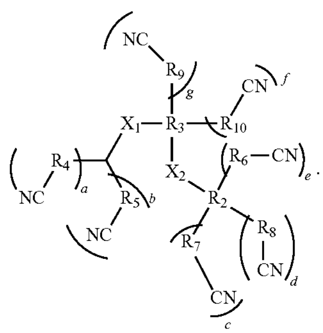

In Formula II, $R_2$ is selected from H, C, CH, $CH_2$, or $CH_3$; $R_3$ is selected from C, CH, or $CH_2$; $R_4$, $R_5$, $R_6$, $R_7$ $R_8$, $R_9$, and $R_{10}$ are each independently selected from a single bond, a substituted or unsubstituted $C_1$ to $C_5$ alkylidene, or —$R_f$—O—$R_g$—, where $R_f$ and $R_g$ each are independently selected from a single bond or a substituted or unsubstituted $C_1$ to $C_5$ alkylidene, in which a substituent for substitution is halogen; $X_1$ and $X_2$ each are independently selected from a single bond, oxygen, or a substituted or unsubstituted $C_1$ to $C_5$ alkylidene, in which a substituent for substitution is halogen; and a, b, c, d, e, f, and g each are independently 0 or 1, and at least three of a, b, c, d, e and f are not zero.

A person skilled in the art can easily understand that in order to comply with the principle of chemical bonding, the values of c, d, e, f, and g depend on the selection of the group of $R_2$ and $R_3$. For example, when $R_2$ is C, the values of c, d, and e are necessarily 1.

In some embodiments, the multi-nitrile compound includes at least one of:

compound II-10 compound II-11

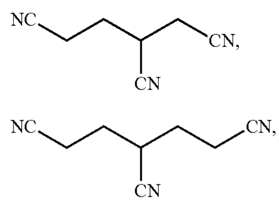

-continued compound II-12 compound II-13 compound II-14 compound II-15 compound II-16

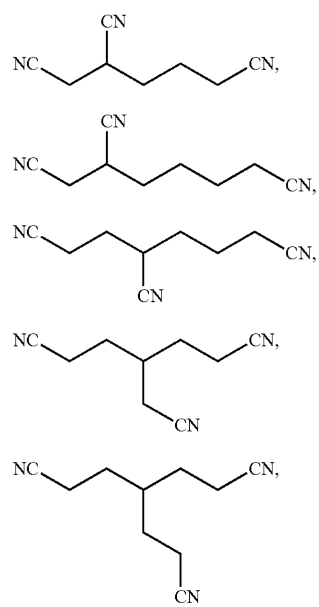

compound II-17 compound II-18 compound II-19 compound II-20

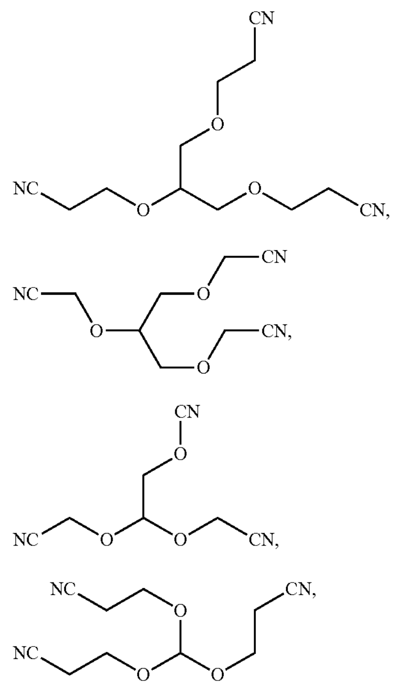

compound II-21 or compound II-22

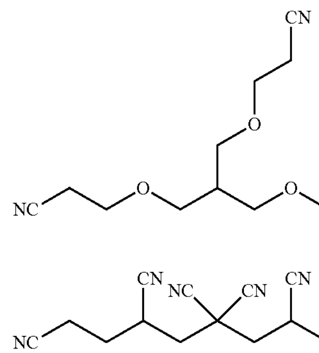

In some embodiments, based on the total weight of the electrolyte, the content of the dinitrile compound is A % and the content of the multi-nitrile compound is B %, 3≤A+B≤20. In some embodiments, the value of A+B may be approximately 3, approximately 4, approximately 5, approximately 6, approximately 7, approximately 8, approximately 9, approximately 10, approximately 12, approximately 15, approximately 17, approximately 20, or may fall within a range formed by any two thereof, for example, approximately 3 to approximately 10, approximately 5 to approximately 15, or approximately 10 to approximately 20.

In some embodiments, based on the total weight of the electrolyte, the content of the dinitrile compound is A %, 2≤A≤16. In some embodiments, the value of A may be approximately 2, approximately 3, approximately 4, approximately 5, approximately 6, approximately 7, approximately 8, approximately 9, approximately 10, approximately 12, approximately 15, approximately 16, or may fall within a range formed by any two thereof, for example, approximately 3 to approximately 10, or approximately 5 to approximately 15.

In some embodiments, based on the total weight of the electrolyte, the content of the multi-nitrile compound is B %, 0.5≤B≤7. In some embodiments, the value of B may be approximately 0.5, approximately 1, approximately 1.5, approximately 2, approximately 2.5, approximately 3, approximately 3.5, approximately 4, approximately 4.5, approximately 5, approximately 5.5, approximately 6, approximately 6.5, approximately 7, or may fall within a range formed by any two thereof, for example, approximately 0.5 to approximately 5, or approximately 2.5 to approximately 7.

In some embodiments, the boron-containing lithium salt includes at least one of lithium bis(oxalato)borate (LiBOB), lithium difluoro(oxalato)borate (LiDFOB), lithium tetrafluoroborate ($LiBF_4$), or lithium tetraborate ( 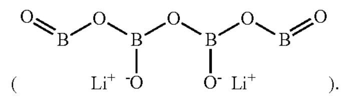 ).

In some embodiments, based on the total weight of the electrolyte, the content of the boron-containing lithium salt is C % and the content of the dinitrile compound is A %, C≤A.

In some embodiments, based on the total weight of the electrolyte, 0.007≤C≤2. In some embodiments, the value of C may be approximately 0.007, approximately 0.01, approximately 0.05, approximately 0.1, approximately 0.25, approximately 0.5, approximately 1, approximately 1.5, approximately 1.8, approximately 2, or may fall within a range formed by any two thereof, for example, approximately 0.01 to approximately 1.5, or approximately 0.1 to approximately 2.

In some embodiments, the electrolyte further includes a boron-free lithium salt. In some embodiments, the boron-free lithium salt is at least one selected from lithium hexafluorophosphate ($LiPF_6$), lithium difluorophosphate ($LiPO_2F_2$), lithium hexafluoroarsenate, lithium perchlorate, lithium bis(fluorosulfonyl)imide (LiFSI), lithium bis(trifluoromethanesulfonyl)imide (LiTFSI), or boron bisoxalate.

In some embodiments, based on the total weight of the electrolyte, the content of the boron-free lithium salt is D % and the weight percent of the boron-containing lithium salt is C %, 0.01≤C/D×12.5≤3.8. When A, B, C, and D of the electrolyte satisfy all the conditions of A/B≥1.2, 0≤(A/B)−C+1≤11, and 0.01≤C/D×12.5≤3.8, the cycle performance of the lithium-ion battery is further improved at a high temperature and in a high state of charge.

In some embodiments, based on the total weight of the electrolyte, 8.75≤D≤20. In some embodiments, the value of D may be approximately 8.75, approximately 9, approximately 10, approximately 11, approximately 12, approximately 13, approximately 14, approximately 15, approximately 16, approximately 17, approximately 18, approximately 19, approximately 20, or may fall within a range formed by any two thereof, for example, approximately 9 to approximately 15, or approximately 10 to approximately 20.

In some embodiments, the electrolyte may further includes fluoroethylene carbonate (FEC). In some embodiments, based on the total weight of the electrolyte, the content of the fluoroethylene carbonate is E % and the content of the dinitrile compound is A %, 5≤A+E≤25. In some embodiments, the value of A+E may be approximately 5, approximately 6, approximately 7, approximately 8, approximately 9, approximately 10, approximately 11, approximately 12, approximately 13, approximately 14, approximately 15, approximately 16, approximately 17, approximately 18, approximately 19, approximately 20, approximately 21, approximately 22, approximately 23, approximately 24, approximately 25, or may fall within a range formed by any two thereof, for example, approximately 6 to approximately 10, or approximately 15 to approximately 20.

In some embodiments, the electrolyte may further includes at least one of 1,3-propane sultone (PS), 1,4-butane sultone, vinylene carbonate (VC), or ethylene sulfate (DTD).

II. Electrochemical Device

This application further provides an electrochemical device. The electrochemical device includes a positive electrode, a negative electrode, a separator, and the electrolyte disclosed in this application. The electrochemical device according to this application may include any device in which an electrochemical reaction occurs. Specific examples of the electrochemical device include all kinds of primary batteries, secondary batteries, fuel batteries, solar batteries, or capacitors. In particular, the electrochemical device is a lithium secondary battery, including a lithium metal secondary battery, a lithium-ion secondary battery, a lithium polymer secondary battery, or a lithium-ion polymer secondary battery. In some embodiments, the electrochemical device according to this application includes: a positive electrode that contains a positive active material capable of occluding and releasing metal ions; a negative electrode that contains a negative active material capable of occluding and releasing metal ions; a separator disposed between the positive electrode and the negative electrode; and the electrolyte disclosed in this application.

In some embodiments, the electrochemical device is a lithium-ion battery. The lithium-ion battery includes a positive electrode, a negative electrode, a separator located between the positive electrode and the negative electrode, and an electrolyte. In some embodiments, the positive electrode includes a positive current collector and a positive active material layer coated on the positive current collector. The negative electrode includes a negative current collector and a negative active material layer coated on the negative current collector. The electrolyte is nonaqueous electrolyte described in any of the foregoing paragraphs.

Electrolyte

The electrolyte used in the electrochemical device of this application is any of the electrolyte described herein above. In addition, the electrolyte used in the electrochemical device of this application may further include other electrolyte obtained without departing from the spirit and scope of this application.

Negative Electrode

The negative electrode used in this application includes negative active material particles that contain a negative active material. In some embodiments, the negative active material particles satisfy at least one of condition (a) or (b): (a) $D_{n10}$ of the negative active material particles is approximately 1 μm to approximately 9 μm; and (b) $D_{v50}$ of the negative active material particles is approximately 5 μm to approximately 18 μm. $D_{n10}$ is a particle size measured in microns when a cumulative number distribution percentage of the negative active material particles reaches 10%. $D_{v50}$ is a particle size measured in microns when a cumulative volume distribution percentage of the negative active material particles reaches 50%. When the negative active material particles satisfy the condition (a) or (b), lithium plating of the negative electrode is suppressed effectively. When the negative active material particles satisfy both condition (a) and condition (b), the negative electrode is free from lithium plating.

Figure 1B:
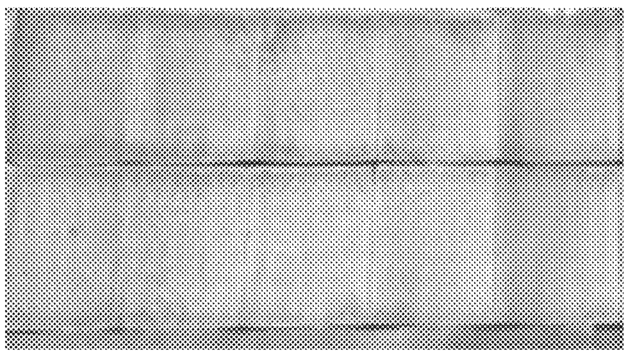
Figure 1C:
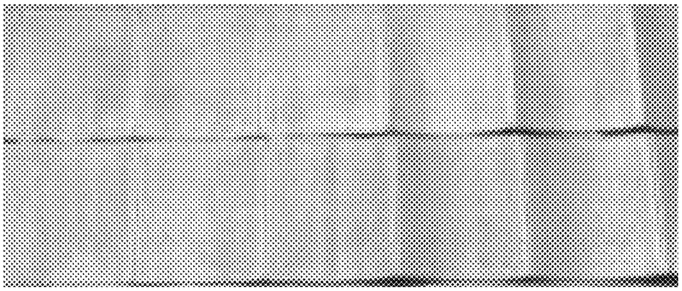

FIG. 1A to FIG. 1C are schematic diagrams showing no occurrence of lithium plating, occurrence of lithium plating, and occurrence of severe lithium plating on a negative electrode of a lithium-ion battery respectively. As shown in FIG. 1A, when the negative electrode of the lithium-ion battery is free from lithium plating, the surface of the negative electrode is smooth. As shown in FIG. 1B, when the negative electrode of the lithium-ion battery incurs lithium plating, metallic lithium is precipitated on a part of the surface of the negative electrode, so that the part of the surface of the negative electrode is rough. As shown in FIG. 1C, when the negative electrode incurs severe lithium plating, most of the surface of the negative electrode is plated with the precipitated metallic lithium, so that most of the surface of the negative electrode is rough. The lithium plating process is irreversible and causes damage to the lithium-ion battery. When the negative electrode of the lithium-ion battery incurs severe lithium plating, the safety of the lithium-ion battery will deteriorate, especially when the lithium-ion battery is subjected to external extrusion and impact.

In some embodiments, when the negative active material particles satisfy at least condition (a), the negative active material particles can further satisfy at least one of condition (c) or (d): (c) when $D_{n10}$ of the negative active material particles is less than 5 μm, $5D_{n10}<D_{v50}<12D_{n10}$; and (d) when $D_{n10}$ of the negative active material particles is greater than or equal to 5 μm, $1.5D_{n10}<D_{v50}<4D_{n10}$.

In some embodiments, the negative active material may include graphite. In some embodiments, $D_{v50}$ of the graphite particles is approximately 5 μm to approximately 18 μm, for example, approximately 5 μm, approximately 7 μm, approximately 10 μm, approximately 12 μm, approximately 15 μm, approximately 18 μm, or falls within a range formed by any two thereof, for example, approximately 7 μm to approximately 15 μm.

In some embodiments, $D_{n10}$ of the graphite particles is approximately 1 μm to approximately 9 μm, for example, approximately 1 μm, approximately 2 μm, approximately 3 μm, approximately 5 μm, approximately 7 μm, approximately 9 μm, or falls within a range formed by any two thereof, for example, approximately 2 μm to approximately 9 μm.

In some embodiments, the negative active material may further include lithium metal, structured lithium metal, natural graphite, artificial graphite, mesocarbon microbead (MCMB), hard carbon, soft carbon, silicon, a silicon-carbon composite, a silicon oxide material, a Li—Sn alloy, a Li—Sn—O alloy, Sn, SnO, $SnO_2$, spinel-structured lithiated $TiO_2$—$Li_4Ti_5O_{12}$, a Li—Al alloy, or any combination thereof.

In some embodiments, the negative electrode includes a negative current collector and a negative active material layer located on the negative current collector. The negative active material layer includes the negative active material.

In some embodiments, the negative active material layer may further include a binder. In some embodiments, the binder includes, but is not limited to: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, or nylon.

In some embodiments, the negative active material layer includes a conductive material. In some embodiments, the conductive material includes, but is not limited to: natural graphite, artificial graphite, carbon black, acetylene black, Ketjen black, carbon fiber, metal powder, metal fiber, copper, nickel, aluminum, silver, or a polyphenylene derivative.

In some embodiments, the negative current collector includes, but is not limited to: a copper foil, a nickel foil, a stainless steel foil, a titanium foil, foamed nickel, foamed copper, or a polymer substrate coated with a conductive metal.

Positive Electrode

In some embodiments, the positive electrode includes a current collector and a positive active material layer located on the current collector. The positive active material layer includes a positive active material. The positive active material includes at least one lithiated intercalation compound that enables reversible intercalation and deintercalation of lithium ions. In some embodiments, the positive active material includes a composite oxide. In some embodiments, the composite oxide contains lithium and at least one element selected from cobalt, manganese, or nickel.

In some embodiments, the positive active material is selected from lithium cobalt oxide $LiCoO_2$ (LCO), a lithium nickel cobalt manganese ternary material (NCM), lithium iron phosphate, lithium manganate, or any combination thereof.

In some embodiments, the positive active material may be coated with a coating layer, or may be mixed with another compound coated with a coating layer. The coating layer may include at least one compound of a coating element, and the compound of a coating element is selected from: an oxide of a coating element, a hydroxide of a coating element, an oxyhydroxide of a coating element, an oxycarbonate of a coating element, and a hydroxycarbonate of a coating element. The compound used for the coating may be amorphous or crystalline.

In some embodiments, the coating element contained in the coating layer may include Mg, Al, Co, K, Na, Ca, Si, Ti, V, Sn, Ge, Ga, B, As, Zr, or F, or any combination thereof. The coating layer may be applied by using any method as long as the method does not adversely affect the performance of the positive active material. For example, the method may include any coating method well known in the art, such as spraying and infiltrating.

The positive active material layer further includes a binder, and optionally includes a conductive material. The binder improves the bonding between particles of the positive active material and the bonding between the positive active material and the current collector.

In some embodiments, the binder includes, but is not limited to: polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, nylon, or the like.

In some embodiments, the conductive material includes, but is not limited to, a carbon-based material, a metal-based material, a conductive polymer, and a mixture thereof. In some embodiments, the carbon-based material is selected from natural graphite, artificial graphite, carbon black, acetylene black, Ketjen black, carbon fiber, or any combination thereof. In some embodiments, the metal-based material is selected from metal powder, metal fiber, copper, nickel, aluminum, or silver. In some embodiments, the conductive polymer is a polyphenylene derivative.

In some embodiments, the current collector may be, but is not limited to, aluminum.

The positive electrode may be prepared according to a preparation method known in the art. For example, the positive electrode may be obtained according to the following method: mixing an active material, a conductive material, and a binder in a solvent to prepare an active material composite, and coating the active material composite onto the current collector. In some embodiments, the solvent may include, but without limitation, N-methyl-pyrrolidone.

In some embodiments, the positive electrode is made of a positive electrode material formed by applying a positive active material layer onto the current collector, where the positive active material layer includes a lithium transition metal-based compound powder and a binder.

In some embodiments, the positive active material layer generally may be made by performing the following operations: dry-mixing the positive electrode material and the binder (as necessary, in addition to a conductive material and a thickener) and making the mixture into a sheet, and crimping the obtained sheet onto the positive current collector; or, dissolving or dispersing such materials into a liquid medium to form a slurry, coating the positive current collector with the slurry, and drying the slurry. In some embodiments, the positive active material layer may be made of any material well known in the art.

Separator

In some embodiments, the electrochemical apparatus according to this application has a separator disposed between the positive electrode and the negative electrode to prevent short circuit. The material and the shape of the separator used in the electrochemical apparatus in this application are not particularly limited, and may be based on any technologies disclosed in the prior art. In some embodiments, the separator includes a polymer or an inorganic compound or the like formed from a material that is stable to the electrolyte according to this application.

For example, the separator may include a substrate layer and a surface treatment layer. The substrate layer is a non-woven fabric, film or composite film, which, in each case, have a porous structure. The material of the substrate layer is selected from at least one of polyethylene, polypropylene, polyethylene terephthalate, and polyimide. Specifically, the material of the substrate layer may be a polypropylene porous film, a polyethylene porous film, a polypropylene non-woven fabric, a polyethylene non-woven fabric, or a polypropylene-polyethylene-polypropylene porous composite film.

In some embodiments, a surface treatment layer is disposed on at least one surface of the substrate layer. The surface treatment layer may be a polymer layer or an inorganic compound layer, or a layer compounded of a polymer and an inorganic compound.

The inorganic compound layer includes inorganic particles and a binder. The inorganic particles are selected from a combination of one or more of an aluminum oxide, a silicon oxide, a magnesium oxide, a titanium oxide, a hafnium dioxide, a tin oxide, a ceria, a nickel oxide, a zinc oxide, a calcium oxide, a zirconium oxide, an yttrium oxide, a silicon carbide, a boehmite, an aluminum hydroxide, a magnesium hydroxide, a calcium hydroxide, and a barium sulfate. The binder is selected from a combination of one or more of a polyvinylidene fluoride, a vinylidene fluoride-hexafluoropropylene copolymer, a polyamide, a polyacrylonitrile, a polyacrylate, a polyacrylic acid, a polyacrylate, a polyvinylpyrrolidone, a polyvinyl ether, a poly methyl methacrylate, a polytetrafluoroethylene, and a polyhexafluoropropylene.

The polymer layer includes a polymer, and the material of the polymer includes at least one of polyamide, polyacrylonitrile, acrylate polymer, polyacrylic acid, polyacrylate, polyvinylpyrrolidone, polyvinyl ether, polyvinylidene fluoride, or poly(vinylidene fluoride-hexafluoropropylene).

III. Electronic Device

The electrochemical device described in this application is applicable to electronic devices in various fields.

The electrochemical apparatus according to this application may be used for purposes not particularly limited, and may be used for any purpose known in the prior art. In an embodiment, the electrochemical device according to this application is applicable to, but without limitation: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

IV. Embodiments

The following describes this application in more detail with reference to embodiments and comparative embodiments. However, this application is not limited to such embodiments, and other embodiments may be obtained without departing from the spirit and scope of this application.

Preparing a Lithium-Ion Battery (1) Preparing a Positive Electrode

Mixing lithium cobaltate, conductive carbon black, and polyvinylidene difluoride (PVDF) at a mass ratio of 97:1.4:1.6, adding N-methyl-pyrrolidone (NMP), and stirring the mixture evenly with a vacuum mixer to obtain a positive slurry, in which a solid content is 72 wt %. Coating the positive slurry evenly onto an aluminum foil serving as a positive current collector, drying the aluminum foil at 85° C., and then performing cold calendering, cutting, slitting, and welding tabs, and drying the aluminum foil under an 85° C. vacuum condition for 4 hours to obtain a positive electrode.

(2) Preparing a Negative Electrode

Mixing artificial graphite, sodium carboxymethyl cellulose (CMC), and styrene butadiene rubber (SBR) at a mass ratio of 97:1:2, adding deionized water, and stirring the mixture evenly with a vacuum mixer to obtain a negative slurry, in which a solid content is 54 wt %. Coating the negative slurry evenly onto a copper foil serving as a negative current collector, drying the copper foil at 85° C., and then performing cold calendering, cutting, slitting, and welding tabs, and drying the copper foil under a 120° C. vacuum condition for 12 hours to obtain a negative electrode.

(3) Preparing an Electrolyte

Mixing ethylene carbonate (EC), propylene carbonate (PC), and diethyl carbonate (DEC) in a dry argon atmosphere glovebox at a mass weight ratio of 1:2:7, adding fluoroethylene carbonate (FEC) at a weight percent of 5% except in the embodiments in Table 4. Then adding an additive, dissolving and stirring the additive thoroughly, adding a lithium salt $LiPF_6$, and mixing them evenly to obtain an electrolyte. The dosage of the additive is shown in Table 1 to Table 4 below. The dosage of the lithium salt $LiPF_6$ is 12% except in the embodiments shown in Table 2. The content of the additive and the lithium salt in the table is a weight percent calculated based on a total weight of the electrolyte.

(4) Separator

The separator is a 7 μm-thick polyethylene (PE) separator.

(5) Preparing a Lithium-Ion Battery

Stacking the positive electrode, the separator, and the negative electrode sequentially, placing the separator between the positive electrode and the negative electrode to serve a function of separation, and winding the stacked materials to obtain a bare cell. Putting the bare cell into an outer package foil made of an aluminum plastic film, performing drying, injecting the electrolyte prepared above, and performing steps such as vacuum sealing, standing, chemical formation (charging the battery at a constant current of 0.02C until a voltage of 3.5 V, and then charging the battery at a constant current of 0.1C until a voltage of 3.9 V), shaping, and capacity test to obtain a pouch-type lithium-ion battery (3.3 mm thick, 39 mm wide, and 96 mm long).

Test Methods

Cycle test performed at a high temperature and in a high state of charge:

First, measuring an initial thickness of the prepared lithium-ion battery in a 50% state of charge (SOC), and recording the thickness as $W_0$. Then charging the lithium-ion battery at a constant current of 0.7C at a constant temperature of 45° C. until a voltage of 4.45 V, charging the battery at a constant voltage until a current of 0.05C, leaving the battery to stand for 10 minutes, and then discharging the battery at a constant current of 0.05C for 60 minutes, thereby completing a charge and discharge cycle. Repeating the charge and discharge steps for 1500 cycles, and then charging the lithium-ion battery at a constant current of 0.7C until a voltage of 4.45 V, then charging the battery at a constant voltage until a current of 0.05C, and then measuring the thickness $W_1$. The cycle performance of the lithium-ion battery at a high temperature and in a high state of charge may be represented by a thickness growth rate. A lower thickness growth rate indicates higher performance.

$$\text{Thickness growth rate (\%)}=(W_1-W_0)/W_0\times100\%$$

Lithium Plating of the Negative Electrode:

After the lithium-ion battery is tested at a high temperature and in a high state of charge, charging the battery at a constant current of 1.5C and a temperature of 25° C. until a voltage of 4.45 V, and then charging the battery at a constant voltage until a current of 0.05C. Disassembling the battery, and checking for lithium plating on the surface of the negative electrode. Criteria of evaluating lithium plating:

No lithium plating: no lithium plating is found on the surface of the negative electrode or the area of lithium plating is smaller than 2%;

Slight lithium plating: the area of lithium plating is 2% to 20%; and

Severe lithium plating: the area of lithium plating is larger than 20%.

Normal-Temperature Cycle Test:

First, measuring the prepared lithium-ion battery, charging the lithium-ion battery at a constant current of 0.7C and a constant temperature of 25° C. until a voltage of 4.45 V, then charging the battery at a constant voltage until a current of 0.05C, and then leaving the battery to stand for 10 minutes, and discharging the battery at a constant current of 0.5C until a voltage of 3.0 V, thereby completing a charge and discharge cycle. Recording the discharge capacity of the cycle as Do. Repeating the charge and discharge steps for 700 cycles, and recording the discharge capacity after the $700^{th}$ cycle as $D_1$.

$$\text{Cycle retention rate (\%)}=D_1/D_0\times100\%.$$

Low-Temperature Discharge Test:

Charging the chemically formed lithium-ion battery at a constant current of 0.7C and a temperature of 25° C. until a voltage of 4.45 V, then charging the battery at a constant voltage until a current of 0.05C, and leaving the battery to stand for 10 minutes; discharging the battery at a constant current of 0.2C until a voltage of 3.0 V, and recording the discharge capacity at this time as $D_2$; then charging the lithium-ion battery at a constant current of 0.7C and a temperature of 25° C. until a voltage of 4.45 V, charging the battery at a constant voltage until a current of 0.05C, storing the battery in a −10° C. environment for 2 hours, and then discharging the battery at a current of 0.2C and a temperature of −10° C. until a voltage of 3.4 V, and recording the discharge capacity at this time as $D_3$.

$$\text{Low-temperature discharge capacity retention rate (\%)}=D_3/D_2\times100\%.$$

Test Results

Table 1 shows the electrolyte parameters and test results of Embodiments 1 to 31 and Comparative Embodiments 1 to 6.

TABLE 1

| | Dinitrile compound | | Multi-nitrile compound | | Boron-containing lithium salt | | | (A/B) − | Thickness |
|---|---|---|---|---|---|---|---|---|---|
| | Structure | Content A % | Structure | Content B % | Structure | Content C % | A/B | C + 1 | growth rate |
| Embodiment 1 | I-4 | 2% | II-14 | 1.5% | LiBOB | 0.10% | 1.3 | 2.2 | 14.9% |
| Embodiment 2 | I-4 | 2.5% | II-14 | 1.5% | LiBOB | 0.10% | 1.7 | 2.6 | 14.0% |
| Embodiment 3 | I-4 | 3% | II-14 | 1.5% | LiBOB | 0.10% | 2.0 | 2.9 | 13.7% |
| Embodiment 4 | I-4 + I-1 | 2% + 1% | II-14 | 1.5% | LiBOB | 0.10% | 2.0 | 2.9 | 13.4% |
| Embodiment 5 | I-4 + I-1 | 2.5% + 1% | II-14 | 1.5% | LiBOB | 0.10% | 2.3 | 3.2 | 13.1% |
| Embodiment 6 | I-4 + I-1 | 3% + 1% | II-14 | 1.5% | LiBOB | 0.10% | 2.7 | 3.6 | 12.6% |
| Embodiment 7 | I-1 + I-6 | 4% + 2% | II-14 | 1.5% | LiBOB | 0.10% | 4.0 | 4.9 | 10.8% |
| Embodiment 8 | I-4 + I-1 + I-6 | 3% + 4% + 2% | II-14 | 1.5% | LiBOB | 0.10% | 6.0 | 6.9 | 9.3% |
| Embodiment 9 | I-4 + I-1 + I-6 | 3% + 4% + 2% | II-14 | 1.0% | LiBOB | 0.10% | 9.0 | 9.9 | 9.7% |
| Embodiment 10 | I-1 + I-6 | 6.5% + 5% | II-14 | 6.0% | LiBOB | 0.10% | 1.9 | 2.8 | 8.4% |
| Embodiment 11 | I-4 | 3% | II-17 | 2.0% | LiBOB | 0.10% | 1.5 | 2.4 | 13.6% |
| Embodiment 12 | I-4 + I-6 + I-8 | 2.5% + 0.5% + 0.5% | II-14 | 1.5% | LiBOB | 0.10% | 2.3 | 3.2 | 11.2% |
| Embodiment 13 | I-4 | 3% | II-14 + II-17 | 1% + 1% | LiBOB | 0.10% | 1.5 | 2.4 | 12.5% |
| Embodiment 14 | I-4 + I-3 | 2% + 1% | II-14 + II-17 | 1% + 1% | LiBOB | 0.10% | 1.5 | 2.4 | 13.3% |
| Embodiment 15 | I-4 + I-5 | 2% + 1% | II-14 + II-17 | 1% + 1% | LiBOB | 0.10% | 1.5 | 2.4 | 13.6% |
| Embodiment 16 | I-4 | 3% | II-22 | 0.50% | LiBOB | 0.10% | 6 | 6.9 | 13.9% |
| Embodiment 17 | I-4 + I-1 | 2% + 1% | II-14 + II-22 | 1.5% + 0.5% | LiBOB | 0.10% | 1.5 | 2.4 | 10.7% |
| Embodiment 18 | I-4 + I-6 + I-8 + I-1 | 2% + 0.5% + 0.5% + 1% | II-14 | 1.50% | LiBOB | 0.10% | 2.7 | 3.6 | 10.1% |
| Embodiment 19 | I-4 + I-1 | 2% + 1% | II-12 | 1.5% | LiBOB | 0.10% | 2.0 | 2.9 | 13.4% |
| Embodiment 20 | I-4 + I-1 | 2% + 1% | II-11 | 1.5% | LiBOB | 0.10% | 2.0 | 2.9 | 13.2% |
| Embodiment 21 | I-4 + I-1 | 2% + 1% | II-14 | 1.5% | LiDFOB | 0.10% | 2.0 | 2.9 | 14.0% |
| Embodiment 22 | I-4 + I-1 | 2% + 1% | II-14 | 1.5% | $LiBF_4$ | 0.10% | 2.0 | 2.9 | 12.7% |
| Embodiment 23 | I-4 + I-1 | 2% + 1% | II-14 | 1.5% | Lithium tetraborate | 0.10% | 2.0 | 2.9 | 12.6% |
| Embodiment 24 | I-4 | 3% | II-17 | 2.0% | LiBOB | 0.05% | 1.5 | 2.5 | 15.8% |
| Embodiment 25 | I-4 | 3% | II-17 | 2.0% | LiBOB | 0.20% | 1.5 | 2.3 | 12.9% |
| Embodiment 26 | I-4 | 3% | II-17 | 2.0% | LiBOB | 0.30% | 1.5 | 2.2 | 11.3% |
| Embodiment 27 | I-4 | 3% | II-17 | 2.0% | LiBOB | 0.50% | 1.5 | 2.0 | 11.1% |
| Embodiment 28 | I-4 | 3% | II-17 | 2.0% | LiBOB | 0.70% | 1.5 | 1.8 | 10.7% |
| Embodiment 29 | I-4 | 3% | II-17 | 2.0% | LiBOB | 1.00% | 1.5 | 1.5 | 10.6% |
| Embodiment 30 | I-4 | 3% | II-17 | 2.0% | LiBOB | 2.00% | 1.5 | 0.5 | 11.3% |
| Embodiment 31 | I-4 | 3% | II-17 | 2.0% | LiBOB + $LiBF_4$ | 0.3% + 0.1% | 1.5 | 2.1 | 10.5% |
| Embodiment 32 | I-4 | 1% | II-17 | 1.0% | LiBOB | 0.10% | 1.0 | 1.9 | 27.6% |
| Embodiment 33 | I-4 | 1.6% | II-17 | 2.0% | LiBOB | 0.10% | 0.8 | 1.7 | 28.4% |
| Comparative Embodiment 1 | I-4 | 2% | — | — | — | — | — | — | 33.4% |
| Comparative Embodiment 2 | — | — | II-17 | 1.0% | — | — | — | — | 32.7% |
| Comparative Embodiment 3 | — | — | — | — | LiBOB | 0.10% | — | — | 52.8% |
| Comparative Embodiment 4 | I-4 | 3% | II-17 | 0.25% | LiBOB | 0.1% | 12.0 | 12.9 | 23.8% |
| Comparative Embodiment 5 | I-4 | 1% | II-17 | 1.0% | LiBOB | 3.00% | 1.0 | −1.0 | 24.1% |

(The symbol "—" in Table 1 means that the substance is not added or not applicable)

As can be learned from comparison between Embodiments 1 to 33 and Comparative Embodiments 1 to 3, the cycle performance of the lithium-ion battery in which the electrolyte contains the dinitrile compound, the multi-nitrile compound, and the boron-containing lithium salt is higher than the cycle performance of the lithium-ion battery in which the electrolyte contains just one of the three substances. When the electrolyte contains the dinitrile compound, the multi-nitrile compound, and the boron-containing lithium salt, the thickness growth rate of the electrochemical device cycled at a high temperature and in a high state of charge is lower, and the cycle performance of the electrochemical device at a high temperature and in a high state of charge is effectively improved.

As can be learned from comparison between Embodiments 1 to 31 and Embodiment 32, when A/B≥1.2, the thickness growth rate of the lithium-ion battery is significantly lower than that when A/B<1.2. Therefore, satisfying the condition of A/B≥1.2 can further improve the cycle performance of the lithium-ion battery at a high temperature and in a high state of charge.

As can be learned from comparison between Embodiments 1-31 and Comparative Embodiments 4 to 5, when A/B≥1.2 and A, B, and C satisfy 0≤(A/B)−C+1≤11, the cycle performance of the lithium-ion battery at a high temperature and in a high state of charge is further improved.

Table 2 shows the electrolyte parameters and test results of Embodiments 34 to 48.

TABLE 2

| | Dinitrile compound | | Multi-nitrile compound | | Boron-containing lithium salt | | Boron-free lithium salt | |
|---|---|---|---|---|---|---|---|---|
| | Structure | Content A % | Structure | Content B % | Structure | Content C % | Structure | Content D % |
| Embodiment 34 | I-4 | 3% | II-14 | 1.5% | LiBOB | 0.05% | $LiPF_6$ | 13% |
| Embodiment 35 | I-4 | 3% | II-14 | 1.5% | LiBOB | 0.10% | $LiPF_6$ | 13% |
| Embodiment 36 | I-4 | 3% | II-14 | 1.5% | LiBOB | 0.30% | $LiPF_6$ | 13% |
| Embodiment 37 | I-4 | 3% | II-14 | 1.5% | LiBOB | 0.50% | $LiPF_6$ | 13% |
| Embodiment 38 | I-4 | 3% | II-14 | 1.5% | LiBOB | 0.70% | $LiPF_6$ | 13% |
| Embodiment 39 | I-4 | 3% | II-14 | 1.5% | LiBOB | 1.00% | $LiPF_6$ | 10% |
| Embodiment 40 | I-4 | 3% | II-14 | 1.5% | LiDFOB | 2.00% | $LiPF_6$ | 11% |
| Embodiment 41 | I-4 | 3% | II-14 | 1.5% | LiDFOB | 2.00% | $LiPF_6$ | 9% |
| Embodiment 42 | I-4 | 3% | II-14 | 1.5% | LiBOB | 0.10% | $LiPF_6$ + $LiPO_2F_2$ | 15% + 1% |
| Embodiment 43 | I-4 | 3% | II-14 | 1.5% | LiDFOB + $LiBF_4$ | 0.3% + 0.1% | $LiPF_6$ + $LiPO_2F_2$ | 15% + 1% |
| Embodiment 44 | I-4 | 3% | II-14 | 1.5% | LiDFOB + lithium tetraborate | 0.3% + 0.1% | $LiPF_6$ | 15% |
| Embodiment 45 | I-4 | 3% | II-14 | 1.5% | LiBOB | 0.10% | $LiPF_6$ + LiFSI | 12.5% + 2% |
| Embodiment 46 | I-4 + I-6 | 2.5% + 0.5% | II-14 | 1.5% | LiBOB | 0.10% | $LiPF_6$ | 13% |
| Embodiment 47 | I-4 | 3% | II-14 | 1.5% | LiBOB | 0.01% | $LiPF_6$ | 18.8% |
| Embodiment 48 | I-4 | 3% | II-14 | 1.5% | LiBOB | 2.00% | $LiPF_6$ | 6.30% |

| | A/B | (A/B) − C + 1 | C/D × 12.5 | Thickness growth rate | Low-temperature discharge capacity retention rate |
|---|---|---|---|---|---|
| Embodiment 34 | 2.0 | 3.0 | 0.05 | 15.6% | 57.6% |
| Embodiment 35 | 2.0 | 2.9 | 0.10 | 13.4% | 58.8% |
| Embodiment 36 | 2.0 | 2.7 | 0.29 | 11.2% | 60.1% |
| Embodiment 37 | 2.0 | 2.5 | 0.48 | 11.0% | 61.7% |
| Embodiment 38 | 2.0 | 2.3 | 0.67 | 10.8% | 62.3% |
| Embodiment 39 | 2.0 | 2.0 | 1.25 | 10.4% | 62.8% |
| Embodiment 40 | 2.0 | 1.0 | 2.27 | 10.7% | 59.7% |
| Embodiment 41 | 2.0 | 1.0 | 2.78 | 11.3% | 58.9% |
| Embodiment 42 | 2.0 | 2.9 | 0.08 | 13.2% | 59.7% |
| Embodiment 43 | 2.0 | 2.6 | 0.31 | 11.5% | 63.3% |
| Embodiment 44 | 2.0 | 2.6 | 0.33 | 11.9% | 63.2% |
| Embodiment 45 | 2.0 | 2.9 | 0.09 | 12.1% | 62.1% |
| Embodiment 46 | 2.0 | 2.9 | 0.10 | 12.7% | 59.0% |
| Embodiment 47 | 2.0 | 3.0 | 0.007 | 18.2% | 50.2% |
| Embodiment 48 | 2.0 | 1.0 | 3.97 | 19.4% | 50.8% |

As can be learned from comparison between Embodiments 34 to 46 and Embodiments 47 to 48, when A, B, and C of the electrolyte satisfy A/B≥1.2 and 0≤(A/B)−C+1≤11, if the weight percent of the boron-containing lithium salt and the weight percent of the boron-free lithium salt further satisfy 0.01≤C/D×12.5≤3.8, the thickness growth rate of the lithium-ion battery cycled at a high temperature and in a high state of charge can be further reduced, thereby further improving the cycle performance of the lithium-ion battery at a high temperature and in a high state of charge, and also improving the low-temperature discharge capacity retention rate. If the C/D ratio is too high, the performance may be affected by a two high concentration of the boron-containing lithium salt and a too thick film formed on the negative electrode. If the C/D ratio is too low, a relatively thin cathode electrolyte interface (CEI) film layer may be formed because the positive electrode cannot be effectively stabilized due to a low concentration of the boron-containing lithium salt.

Table 3 shows the electrolyte parameters and test results of Embodiments 49 to 54.

TABLE 3

| | Dinitrile compound | | Multi-nitrile compound | | Boron-containing lithium salt | | | | | | Thickness | |
|---|---|---|---|---|---|---|---|---|---|---|---|---|
| | Structure | Content A % | Structure | Content B % | Structure | Content C % | A/B | (A/B) − C + 1 | $D_{n10}$ (μm) | $D_{v50}$ (μm) | growth rate | Lithium plating |
| Embodiment 49 | I-4 | 2% | II-14 | 1.50% | LiBOB | 0.10% | 1.3 | 2.2 | 6.8 | 17.8 | 14.1% | No lithium plating |
| Embodiment 50 | I-4 + I-3 | 2% + 1% | II-14 + II-17 | 1% + 1% | LiBOB | 0.10% | 1.5 | 2.4 | 7.8 | 16.7 | 13.2% | No lithium plating |
| Embodiment 51 | I-4 | 2% | II-14 | 1.50% | LiBOB | 0.10% | 1.3 | 2.2 | 1.8 | 13.5 | 14.9% | No lithium plating |
| Embodiment 52 | I-4 | 2% | II-14 | 1.50% | LiBOB | 0.10% | 1.3 | 2.2 | 1.3 | 12.1 | 15.3% | No lithium plating |
| Embodiment 53 | I-4 | 2% | II-14 | 1.50% | LiBOB | 0.10% | 1.3 | 2.2 | 11 | 22 | 15.6% | Severe lithium plating |
| Embodiment 54 | I-4 | 2% | II-14 | 1.50% | LiBOB | 0.10% | 1.3 | 2.2 | 2.5 | 33 | 15.7% | Slight lithium plating |

As can be learned from Table 3, when A, B, and C of the electrolyte of the lithium-ion battery satisfy A/B≥1.2 and 0≤(A/B)−C+1≤11, if $D_{n10}$ of the negative active material particles of the lithium-ion battery is approximately 1 μm to approximately 9 μm and/or $D_{v50}$ is approximately 5 μm to approximately 18 μm, the lithium plating of the negative electrode can be suppressed. When $D_{n10}$ of the negative active material particles is less than 5 μm (for example, in Embodiments 51 and 52), if the negative active material particles satisfy $5D_{n10}<D_{v50}<12D_{n10}$, the cycle performance of the lithium-ion battery at a high temperature and in a high state of charge is relatively good. When $D_{n10}$ of the negative active material particles is greater than or equal to 5 μm (for example, in Embodiments 49 and 50), if the negative active material particles satisfy $1.5D_{n10}<D_{v50}<4D_{n10}$, the performance of the lithium-ion battery is relatively good. That is because ion and electron transmission paths are longer if the values of $D_{n10}$ and $D_{v50}$ are too large, resulting in lower kinetic performance.

Table 4 shows the electrolyte parameters and test results of Embodiment 4 and Embodiments 55 to 65.

TABLE 4

| | Dinitrile compound | | Multi-nitrile compound | | Boron-containing lithium salt | | | | FEC | | Thickness | Cycle capacity |
|---|---|---|---|---|---|---|---|---|---|---|---|---|
| | Structure | Content A % | Structure | Content B % | Structure | Content C % | A/B | (A/B) − C + 1 | content E % | A + E | growth rate | retention rate |
| Embodiment 4 | I-4 + I-1 | 2% + 1% | II-14 | 1.5% | LiBOB | 0.1% | 2.0 | 2.9 | 5% | 8 | 13.4% | 85.9% |
| Embodiment 55 | I-4 | 2% | II-14 | 1.50% | LiBOB | 0.1% | 1.3 | 2.2 | 3.5% | 5.5 | 14.3% | 84.3% |
| Embodiment 56 | I-4 + I-3 | 2% + 1% | II-14 + II-17 | 1% + 1% | LiBOB | 0.1% | 1.5 | 2.4 | 4% | 7 | 12.9% | 82.4% |
| Embodiment 57 | I-4 + I-1 | 2.5% + 1% | II-14 | 1.5% | LiBOB | 0.1% | 2.3 | 3.2 | 7% | 10.5 | 13.8% | 86.3% |
| Embodiment 58 | I-4 + I-1 | 3% + 1% | II-14 | 1.5% | LiBOB | 0.1% | 2.7 | 3.6 | 8% | 12 | 13.4% | 86.7% |
| Embodiment 59 | I-1 + I-6 | 4% + 2% | II-14 | 1.5% | LiBOB | 0.1% | 4.0 | 4.9 | 10% | 16 | 11.3% | 86.5% |
| Embodiment 60 | I-4 + I-1 + I-6 | 3% + 4% + 2% | II-14 | 1.5% | LiBOB | 0.1% | 6.0 | 6.9 | 12% | 21 | 10.1% | 82.3% |

TABLE 4-continued

| | Dinitrile compound | | Multi-nitrile compound | | Boron-containing lithium salt | | | | FEC | | Thickness | Cycle capacity |
|---|---|---|---|---|---|---|---|---|---|---|---|---|
| | Structure | Content A % | Structure | Content B % | Structure | Content C % | A/B | (A/B) − C + 1 | content E % | A + E | growth rate | retention rate |
| Embodiment 61 | I-4 + I-1 + I-6 | 3% + 4% + 2% | II-14 | 1.0% | LiBOB | 0.1% | 9.0 | 9.9 | 13% | 22 | 10.7% | 82.8% |
| Embodiment 62 | I-1 + I-6 | 6.5% + 5% | II-14 | 6.0% | LiBOB | 0.1% | 1.9 | 2.8 | 14% | 25.5 | 9.9% | 80.1% |
| Embodiment 63 | I-1 + I-6 | 2% | II-14 | 1.50% | LiBOB | 0.1% | 1.3 | 2.2 | 2% | 4 | 13.2% | 70.2% |
| Embodiment 64 | I-4 + I-3 | 4% + 2% | II-14 | 1% + 1% | LiBOB | 0.1% | 1.5 | 2.4 | 22% | 28 | 16.6% | 87.3% |
| Embodiment 65 | I-4 + I-1 | 3% + 1% | II-14 | 1.5% | LiBOB | 0.1% | 2.7 | 3.6 | 0% | 4 | 18.4% | 66.7% |

As can be learned from comparison between Embodiment 4 and Embodiments 55 to 65 in Table 4, when A, B, and C of the electrolyte of the lithium-ion battery satisfy A/B≥1.2 and 0≤(A/B)−C+1≤11, if the electrolyte of the lithium-ion battery further satisfies 5≤A+E≤25, the thickness growth rate of the lithium-ion battery cycled at a high temperature and in a high state of charge is relatively low, and the normal-temperature cycle performance of the lithium-ion battery is relatively high. A possible reason is that the dinitrile compound is unstable to the negative electrode, the negative electrode needs to be protected by a film formed by the FEC, but the FEC is unstable at high temperatures and the dinitrile compound is required to strengthen protection for the positive electrode. Therefore, the performance is relatively high when the sum of the content of the dinitrile compound and the content of the FEC falls within a given range.

The foregoing description is merely several embodiments of this application, and is not intended to limit this application in any form. Although this application is disclosed above with reference to the exemplary embodiments, the exemplary embodiments are not intended to limit this application. Any modifications or improvements, which may be made by a person skilled in the art by using the foregoing technical content without departing from the scope of the technical solutions of this application, are treated as equivalents of this application, and fall within the scope of the technical solutions of this application.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment or example in this application. In addition, specific features, structures, materials, or characteristics herein may be combined in one or more embodiments or examples in any appropriate manner.

Although illustrative embodiments have been demonstrated and described above, a person skilled in the art understands that the above embodiments are not to be construed as a limitation on this application, and changes, replacements, and modifications may be made to the embodiments without departing from the spirit, principles, and scope of this application.

What is claimed is:

1. An electrolyte, comprising: a dinitrile compound, a multi-nitrile compound with more than two cyano groups, a boron-containing lithium salt, and a boron-free lithium salt;

wherein the boron-containing lithium salt comprises at least one of lithium bis(oxalato)borate, lithium difluoro (oxalato)borate, or lithium tetraborate;

wherein, based on a total weight of the electrolyte, a content of the dinitrile compound is A %, a content of the multi-nitrile compound is B %, and a content of the boron-containing lithium salt is C %, $$0 \le (A/B) - C + 1 \le 11, 2.3 \le A/B \le 9, \text{ and } 5 \le A+B \le 20; \text{ and}$$

based on the total weight of the electrolyte, a content of the boron-free lithium salt is D %, and 0.01≤C/D×12.5≤3.8.

2. The electrolyte according to claim 1, wherein the dinitrile compound comprises a compound represented by Formula I:

Formula I

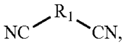

wherein, $R_1$ is selected from a substituted or unsubstituted $C_1$ to $C_9$ alkylidene, a substituted or unsubstituted $C_2$ to $C_{10}$ alkenylene, —$R_a$—O—$R_b$—, or —$R_c$—O—$R_d$—O—$R_e$—, wherein $R_a$, $R_b$, $R_c$, and $R_e$ each are independently selected from a single bond or a substituted or unsubstituted $C_1$ to $C_5$ alkylidene, $R_a$ and $R_b$ are not both single bonds, and $R_d$ is selected from a substituted or unsubstituted $C_1$ to $C_5$ alkylidene, in which a substituent for substitution is halogen;

the multi-nitrile compound comprises a compound represented by Formula II:

Formula II

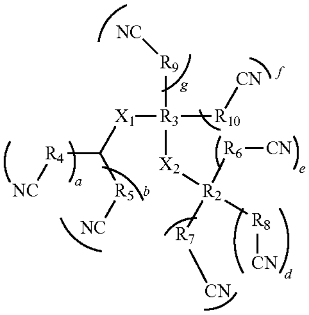

wherein, $R_2$ is selected from H, C, CH, $CH_2$, or $CH_3$;

$R_3$ is selected from C, CH, or $CH_2$;

$R_4$, $R_5$, $R_6$, $R_7$ $R_8$, $R_9$, and $R_{10}$ each are independently selected from a single bond, a substituted or unsubstituted $C_1$ to $C_5$ alkylidene, or —$R_f$—O—$R_g$—, wherein $R_f$ and $R_g$ each are independently selected from a single bond or a substituted or unsubstituted $C_1$ to $C_5$ alkylidene, in which a substituent for substitution is halogen;

$X_1$ and $X_2$ each are independently selected from a single bond, oxygen, or a substituted or unsubstituted $C_1$ to $C_5$ alkylidene, in which a substituent for substitution is halogen; and a, b, c, d, e, f, and g each are independently 0 or 1, and at least three of a, b, c, d, e and f are not zero.

3. The electrolyte according to claim 1, wherein the dinitrile compound comprises at least one of:

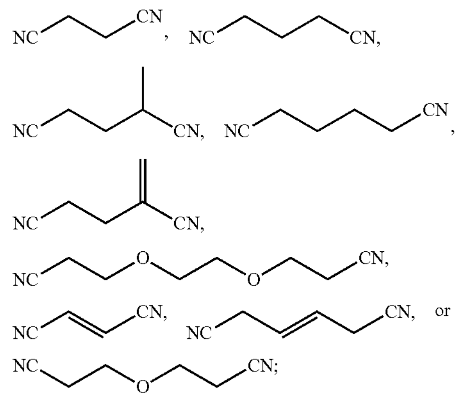

or and the multi-nitrile compound comprises at least one of:

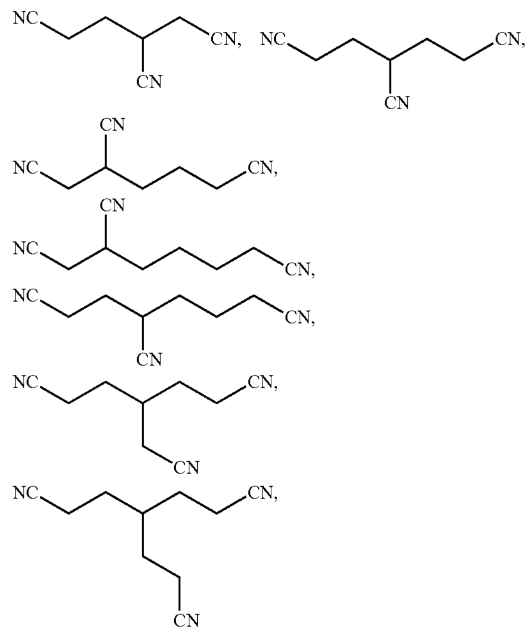

-continued

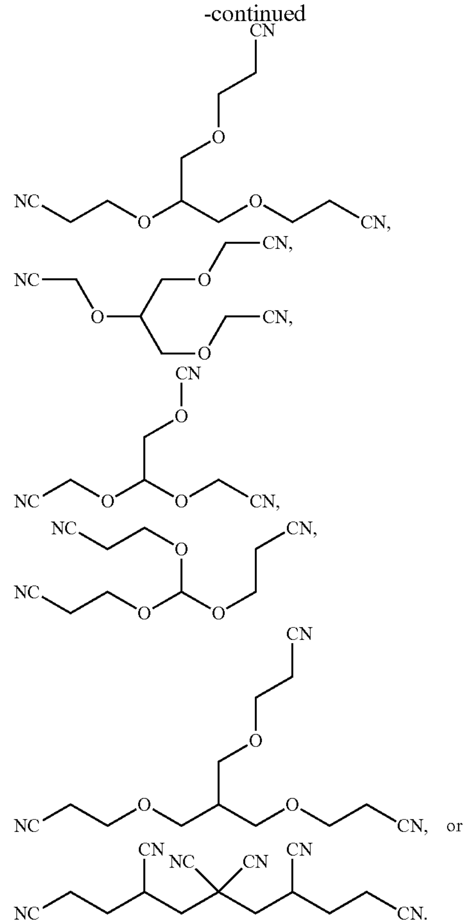

or

4. The electrolyte according to claim 1, wherein the boron-containing lithium salt further comprises lithium tetrafluoroborate, wherein C≤A.

5. The electrolyte according to claim 1, further comprising fluoroethylene carbonate and, based on the total weight of the electrolyte, a content of the fluoroethylene carbonate is E %, and 5≤A+E≤25.

6. The electrolyte according to claim 1, wherein 2.5≤A≤16.

7. The electrolyte according to claim 1, wherein 4.9≤(A/B)−C+1≤11.

8. The electrolyte according to claim 1, wherein 6≤A≤16.

9. The electrolyte according to claim 1, further comprising fluoroethylene carbonate and, based on the total weight of the electrolyte, a content of the fluoroethylene carbonate is E %, wherein 12≤A+E≤25.

10. An electrochemical device, wherein the electrochemical device comprising a positive electrode, a negative electrode, a separator, and an electrolyte, wherein the electrolyte comprises a dinitrile compound, a multi-nitrile compound with more than two cyano groups, a boron-containing lithium salt, and a boron-free lithium salt, wherein the boron-containing lithium salt comprises at least one of lithium bis(oxalato)borate, lithium difluoro (oxalato)borate, or lithium tetraborate;

wherein, based on a total weight of the electrolyte, a weight percent of the dinitrile compound is A %, a content of the multi-nitrile compound is B %, and a content of the boron-containing lithium salt is C %, $$0 \le (A/B) - C + 1 \le 11, 2.3 \le A/B \le 9, \text{ and } 5 \le A + B \le 20; \text{ and}$$

based on the total weight of the electrolyte, a content of the boron-free lithium salt is D %, and $0.01 \leq C/D \times 12.5 \leq 3.8$.

11. The electrochemical device according to claim 10, wherein the dinitrile compound comprises at least one of:

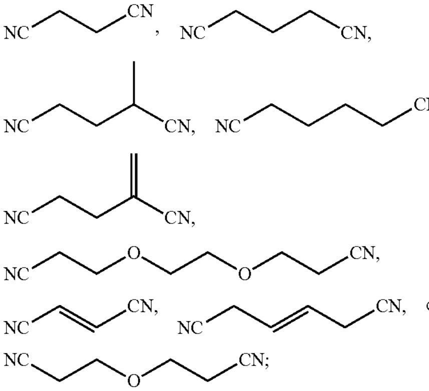

or and the multi-nitrile compound comprises at least one of:

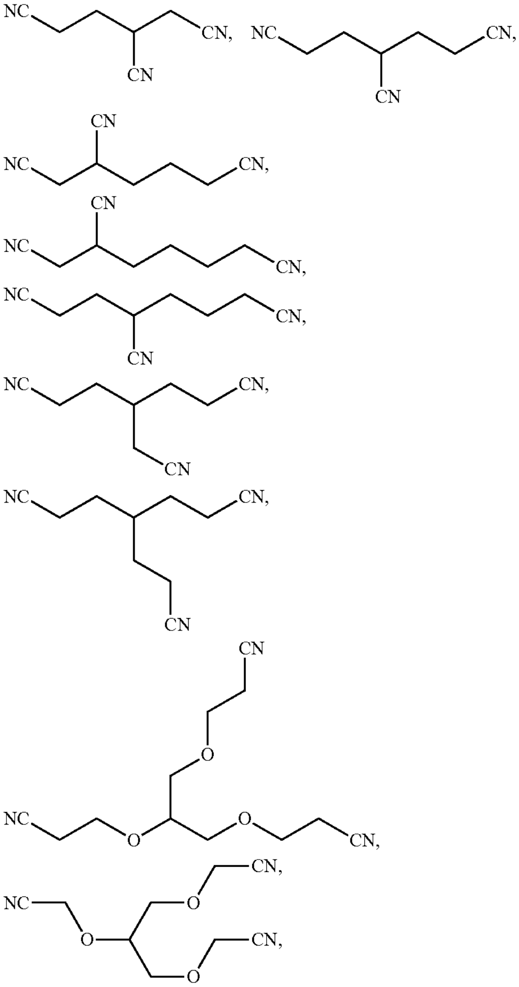

-continued

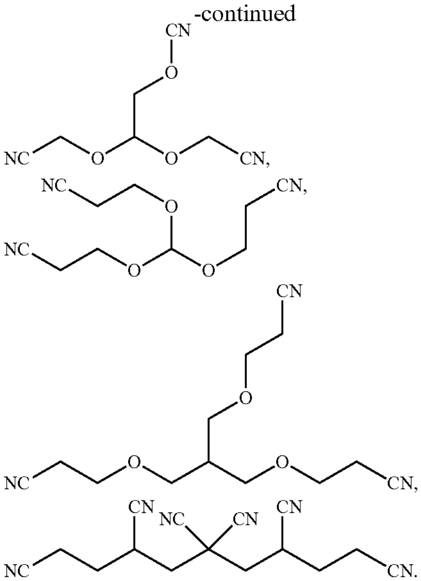

or

12. The electrochemical device according to claim 10, wherein the boron-containing lithium salt further comprises lithium tetrafluoroborate.

13. The electrochemical device according to claim 10, wherein $C \leq A$.

14. The electrochemical device according to claim 10, further comprising fluoroethylene carbonate and, based on the total weight of the electrolyte, a content of the fluoroethylene carbonate is E %, and $5 \leq A+E \leq 25$.

15. The electrochemical device according to claim 10, wherein the negative electrode comprises negative active material particles, and the negative active material particles satisfy at least one of condition (a) or (b):

(a) $D_{n10}$ of the negative active material particles is 1 μm to 9 μm; and (b) $D_{v50}$ of the negative active material particles is 5 μm to 18 μm.

16. The electrochemical device according to claim 15, wherein, when the negative active material particles satisfy at least condition (a), the negative active material particles further satisfy at least one of condition (c) or (d):

(c) when $D_{n10}$ of the negative active material particles is less than 5 μm, $5D_{n10}<D_{v50<12}D_{n10}$; and (d) when $D_{n10}$ of the negative active material particles is greater than or equal to 5 μm, $1.5D_{n10}<D_{v50<4}D_{n10}$.

17. An electronic device, wherein the electronic device comprises a electrochemical device, wherein the electrochemical device comprises a positive electrode, a negative electrode, a separator, and an electrolyte, wherein the electrolyte comprises a dinitrile compound, a multi-nitrile compound with more than two cyano groups, a boron-containing lithium salt, and a boron-free lithium salt;

wherein the boron-containing lithium salt comprises at least one of lithium bis(oxalato)borate, lithium difluoro (oxalato)borate, or lithium tetraborate;

wherein, based on a total weight of the electrolyte, a content of the dinitrile compound is A %, a content of the multi-nitrile compound is B %, and a content of the boron-containing lithium salt is C %, $$0 \leq (A/B)-C+1 \leq 11, 2.3 \leq A/B \leq 9, \text{ and } 5 \leq A+B \leq 20; \text{ and}$$

based on the total weight of the electrolyte, a content of the boron-free lithium salt is D %, and $0.01 \leq C/D \times 12.5 \leq 3.8$.

* * * * *